UNITED STATES PATENT OFFICE.

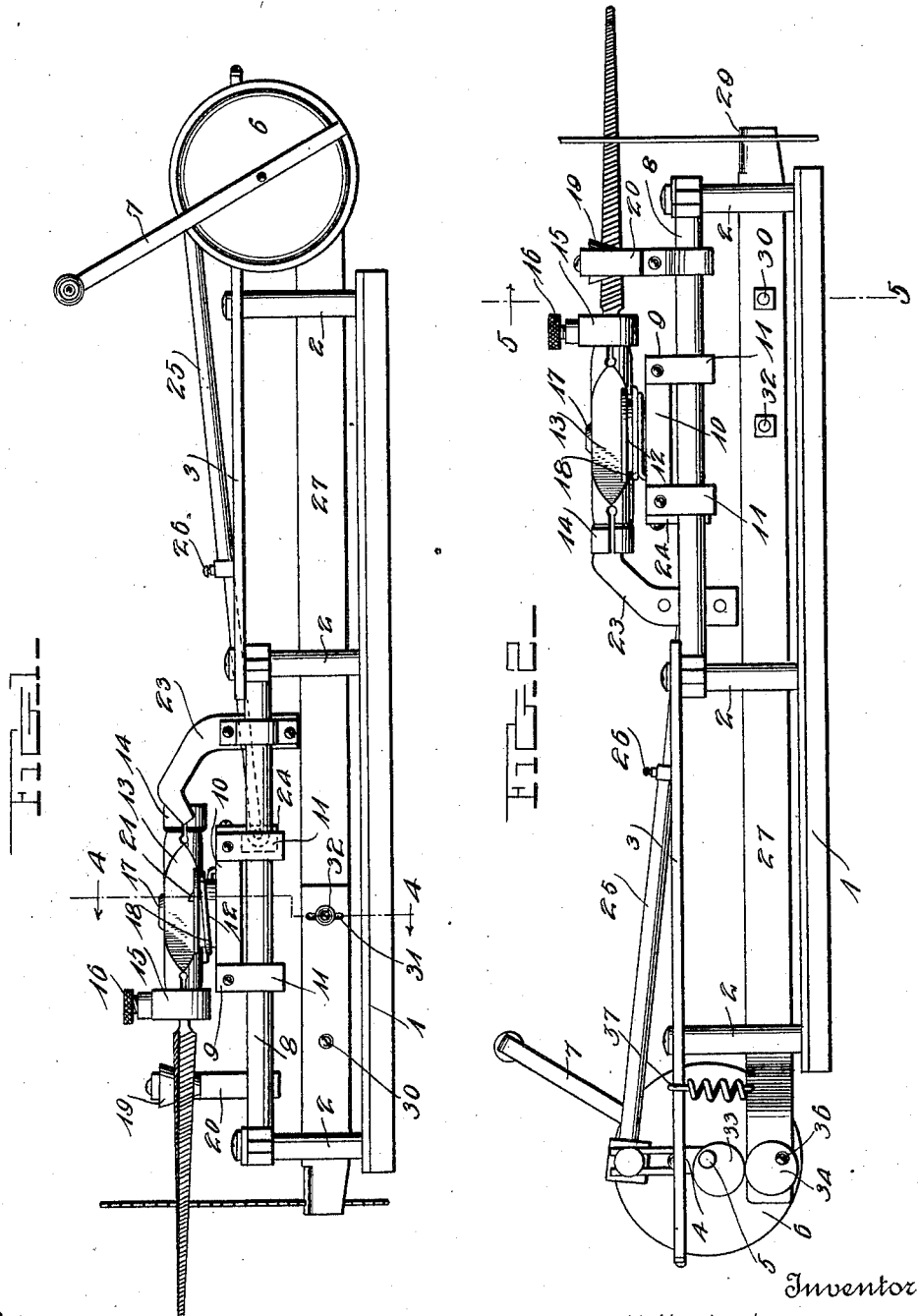

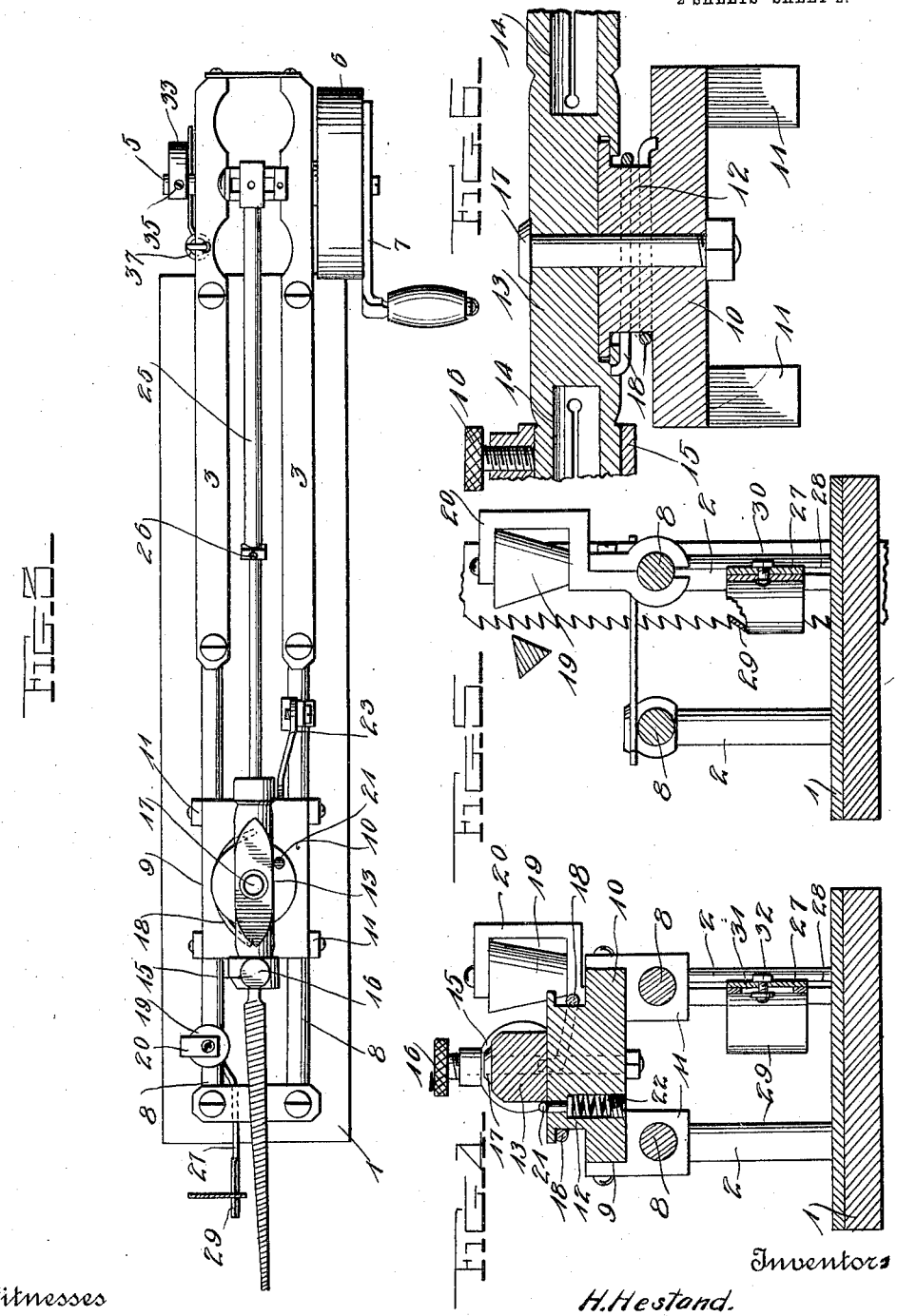

HARDY HESTAND AND CHARLES F. DAYTON, OF CHICKASHA, OKLAHOMA, ASSIGNORS TO GRANVILLE M. CARR AND RODOLPHUS H. JONES, OF CHICKASHA, OKLAHOMA.

BAND-SAW-FILING MACHINE.

1,038,885.  Specification of Letters Patent.  Patented Sept. 17, 1912.

Application filed June 29, 1911. Serial No. 635,947.

*To all whom it may concern:*

Be it known that we, HARDY HESTAND and CHARLES F. DAYTON, citizens of the United States, residing at Chickasha, in the county of Grady and State of Oklahoma, have invented certain new and useful Improvements in Band-Saw-Filing Machines; and we do declare the following to be a full, clear, and exact description of the invention, such as will enable others skilled in the art to which it appertains to make and use the same.

This invention relates to improvements in band saw filing machines.

One object of the invention is to provide a band saw filing machine adapted to file a saw without removing it from the sawing machine.

Another object is to provide a saw filing machine having adjustable means for automatically feeding the saw to bring the successive teeth thereon into position for engagement by the file.

A further object is to provide a machine of this character having means whereby the file is swung out of the way and held in position to prevent the same from engaging the saw on the return stroke of the file.

With these and other objects in view, the invention consists of certain novel features of construction, combination and arrangement of parts as will be more fully described and particularly pointed out in the appended claims.

In the accompanying drawings: Figure 1 is a front view of our improved saw filing machine; Fig. 2 is a rear view thereof; Fig. 3 is a top plan view; Fig. 4 is a vertical cross section on the line 4—4 of Fig. 1; Fig. 5 is a similar view on the line 5—5 of Fig. 2; Fig. 6 is a central vertical longitudinal section of the file carriage.

Our improved saw filing machine comprises a base plate 1 having secured thereto a series of vertically disposed supporting posts 2, to which at one end of the machine are secured a pair of horizontally disposed bearing plates 3 to the rearwardly projecting ends of which are secured bearings 4 in which is revolubly mounted a crank shaft 5. On one end of the crank shaft 5 is secured a fly wheel 6 to which is connected a crank handle 7 whereby the shaft may be turned. Secured to the posts 2 at the opposite end of the machine are longitudinally disposed parallel carriage supporting and guiding bars 8 on which is slidably mounted a file carriage 9, said carriage comprising a plate 10, on the lower side of which are arranged pairs of apertured guiding and supporting lugs 11. Secured to the upper side of the plate 10 is a circular boss 12 on which is pivotally mounted a file handle or holder 13, said holder having on its outer ends split sockets 14 adapted to receive the stem of the file. The file when thus engaged with the socket at one end of the holder is clamped into operative engagement therewith by means of a collar 15 having arranged therein a set screw 16 whereby the sides of the split socket are drawn together into rigid engagement with the stem or shank of the file as shown.

The holder 13 is pivotally secured to the boss 12 and plate 10 of the carriage by a pivot bolt 17 arranged through the center of said parts as shown. The boss 12 is provided on its upper side with a radially projecting annular flange and around said boss is arranged a coiled spring 18 one end of which is secured to the plate 10 of the carriage and the other end to the lower side of the file holder 13. When thus arranged the pressure of the spring is applied to the file holder to swing the latter and the file into forcible engagement with the teeth of the saw on the forward stroke of the carriage.

In order to swing the file holder to a position for preventing the engagement of the file with the saw on the return stroke of the carriage, we provide a holder actuating tapered roller 19 which is revolubly mounted on a suitable supporting post 20 secured to one of the guide bars 8 near the outer end thereof as shown. The roller 19 when thus arranged will be in position to be engaged by the collar 15 on the forward end of the file holder when the latter has been moved by the carriage to the end of the working stroke and when thus engaged by said collar will force the holder and the file outwardly away from the saw. When the saw and file have thus been forced laterally the same are held in this position by means of a stop stud 21 the upper end of which is beveled or formed at a slight angle toward the rear end of the machine as shown. The stud 21 is slidably mounted in a socket formed in the boss 12 and plate 10 and is forced upwardly by means of a coiled spring 22 arranged in the lower end of the socket as shown. Secured to the carriage guiding and supporting bar 8 at this side of the carriage is a stud depressing arm 23 having its upper end bent in position to engage the stud 21 when the carriage is brought back on its return stroke and when the stud is thus forced downwardly or retracted by the arm 23 the spring 18 will swing the file holder around over the depressed upper end of the stud thereby holding the latter in a depressed position and permitting the spring to actuate the holder in the proper direction for engaging the file with the teeth of the saw while the carriage is being moved forwardly on its working stroke. As soon as the carriage has reached the limit of its working stroke, the collar 15 on the outer end of the file holder will come into engagement with the roller 19 which will force this end of the carriage laterally thus turning the same on its pivot bolt 17 whereupon the inner end of the holder will be moved from over the upper end of the stud 21 thus permitting the spring 22 to force the latter up above the boss 12 whereby said stud forms a stop for the saw carriage and holds the latter in the inoperative position to which it was shifted by the roller 21. The file and holder are thus held in an inoperative position during the return stroke of the carriage and until the stud 21 is again brought into engagement with its depressing arm 23 which will depress the stud and permit the spring 18 to again swing the file holder and file into position to engage the latter with the saw teeth as soon as the carriage is again moved forward on its working stroke.

On the inner end of the file carriage is secured a depending bearing bracket 24 to which is connected the adjacent end of a carriage operating pitman rod 25 the opposite end of which is pivotally connected with the crank shaft 5 whereby when the latter is revolved by the handle 7, the carriage will be reciprocated on its supporting and guiding bars 8 as will be readily understood. The pitman rod 25 is preferably formed in adjustable telescopically engaged sections which are adjustably secured together by means of a set screw 26 arranged therein as shown. By thus constructing the pitman rod the length of the same may be increased or diminished and the position and movement of the carriage regulated. The crank arm of the shaft 5 is also preferably slotted as shown and the end of the pitman rod 25 adjustably connected thereto, thereby providing means whereby the throw of the carriage is regulated.

In order to shift the saw to bring the successive teeth thereon into position to be engaged by the file when the latter is reciprocated in the manner described, we provide a saw shifting plate or bar 27 which is arranged through vertically disposed slots or passages 28 formed in the supporting posts 2 along one side of the machine. The bar or plate 27 when thus arranged is pivotally connected to the central post with which the bar is engaged and is thus adapted to be rocked in a vertical plane. On the forward or working end of the bar 27 is pivotally and adjustably secured a curved tooth engaging plate or pawl 29, said pawl being in the form of a spring metal plate pivoted intermediate of its ends by a pivot bolt 30 to the forward end of the bar 27 and having in its inner end a transverse slot 31 with which and the adjacent portion of the bar 27 is engaged a clamping screw 32 whereby when the pawl 29 is adjusted on its pivot screw 30 to the desired position, said screw 32 is tightened up and the pawl thus fastened in its adjusted position for engaging the teeth of the saw.

In order to rock the bar 27 at the proper time for engaging the pawl 29 with the teeth of the saw, we provide a pair of bar operating cams 33 and 34 one of which is secured to the adjacent end of the crank shaft by means of a set screw 35 arranged through the cam and adapted to be screwed into engagement with the shaft whereby the cam is adjustably secured to the latter. The cam 34 is adjustably secured to the adjacent end of the bar 27 by a fastening screw 36 in position to be engaged by the cam 33 on the crank shaft when the latter is revolved thereby rocking the bar 27 to swing the outer end of the latter upwardly thus raising the saw to the distance of one tooth at each revolution of the crank shaft. The rocker bar 27 is operated in the opposite direction to disengage the pawl 29 from the teeth of the saw and to swing the forward end of the arm downwardly by means of a spring 37 one end of which is secured to the rocker bar and the opposite end to the adjacent bearing bar 3 as shown. The cams 33 and 34 are arranged in such position with respect to the crank on the shaft 5 that they will operate the bar 27 at the proper time for raising the saw on the return stroke of the carriage. By adjustably connecting the cams to the shaft and bar, the throw of the latter may be regulated and the parts thus properly adjusted for shifting saws having different sizes of teeth.

In using our improved filing machine the same is clamped in position on the saw table and the saw quickly and easily filed without removing or disturbing the same in any manner thereby greatly facilitating the filing operation.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described our invention, what we claim is:

1. A band saw filing machine comprising a supporting frame, a carriage slidably mounted therein, means to reciprocate said carriage, a file holder pivotally mounted on said carriage, means to hold the file in operative engagement with the saw on the working stroke of the carriage, a roller disposed to engage said holder to swing it laterally and thereby disengage the file from the saw when the carriage has reached the limit of its working stroke, a spring projected stop adapted to engage said holder during the return stroke of the carriage, a stop depressing arm for engagement with said stop when the carriage has reached the limit of its return stroke, thereby releasing said file holder.

2. A band saw filing machine comprising a supporting frame, a carriage slidably mounted therein, means to reciprocate said carriage, a file holder pivotally mounted on said carriage, a spring connected with said file holder and adapted to cause the same to hold the file in operative engagement with the saw on the working stroke of the carriage, a holder operating roller adapted to engage said holder to swing the same laterally to disengage the file from the saw when the carriage has reached the limit of its working stroke, a spring projected stop pin adapted to engage said holder when moved laterally by said roller thereby fastening the file holder in an inoperative position during the return stroke of the carriage, a stud depressing arm adapted to engage said stud when the carriage has reached the limit of its return stroke thereby releasing said file holder and permitting its spring to swing the same in position to again engage the file with the saw on the working stroke of the carriage.

3. A band saw filing machine comprising a supporting frame, a file operating carriage slidably mounted in said frame, a file holder pivotally mounted on said carriage, a spring adapted to actuate said holder whereby the file is held in yielding engagement with the saw on the working stroke of the carriage, means to swing the file holder laterally and thereby disengage the file from the saw when the carriage has reached the limit of its working stroke, a stop to fasten said holder in an inoperative position during the return stroke of the carriage whereby the file is prevented from engaging the saw, means to release said stop from said file holder when the carriage has reached the limit of its return stroke, a crank shaft revolubly mounted in said frame, means to operate said shaft, a pitman rod adapted to operatively connect said crank shaft with said carriage, and an automatically operated saw feeding mechanism whereby the saw is shifted to bring the successive teeth thereon into position to be engaged by the file on the working stroke of the carriage.

In testimony whereof we have hereunto set our hands in presence of two subscribing witnesses.

HARDY HESTAND.
CHARLES F. DAYTON.

Witnesses:
P. J. HARHAM,
ORAH L. DEWS.

---

Copies of this patent may be obtained for five cents each, by addressing the "Commissioner of Patents, Washington, D. C."